Patented Aug. 31, 1937

2,091,800

UNITED STATES PATENT OFFICE 2,091,800

METHOD OF HYDROGENATING ESTERS

Homer Adkins, Karl Folkers, and Ralph Connor, Madison, Wis., assignors to Rohm & Haas Company, Philadelphia, Pa.

No Drawing. Application September 15, 1931, Serial 563,000

11 Claims. (Cl. 260—156)

This invention relates to catalysts and catalytic processes and comprises particularly the hydrogenation of esters to alcohols in the liquid phase in the presence of highly efficient catalysts containing oxides of copper with or without oxides of other hydrogenating metals, oxides of one or more acid-forming metals, with or without oxides of alkalies or alkaline earths, especially the use in such processes of catalysts containing oxides of copper and chromium and including for improved results oxides of barium, calcium or magnesium.

In copending application Serial No. 593,190 filed Feb. 15, 1932 there are described methods of preparing catalysts suitable for use in this process. The instant application is not, however, to be confined to catalysts prepared by any special method since our invention lies in the discovery of the great efficiency of these new type catalysts and their value in the hydrogenation of esters in the liquid phase.

The only general method which has been used for the reduction of esters to the corresponding primary alcohols has been that involving the use of sodium and alcohol. This process in its various modifications has been used in the transformation of a large variety of acids, through their esters, to the corresponding primary alcohols. This reaction, however, leaves much to be desired in many cases because of low yields, difficulties of operation, and undesirable side reactions. In view of the importance of this reaction, a search for a catalyst and experimental conditions under which the reduction could be brought about by the use of hydrogen has been in progress for some time. Recently this search has been successful and we have discovered a method whereby various types of esters may be directly hydrogenated to the corresponding alcohols in excellent yields as indicated in the equation:

$$RCOOC_2H_5 + 2H_2 = RCH_2OH + C_2H_5OH$$

The essence of our invention lies in the discovery that catalysts containing oxide of copper with or without oxides of other hydrogenating metals, and oxides of one or more acid-forming metals, especially chromium oxide operate in liquid phase hydrogenation of esters to give results vastly superior to those produced by any known catalysts or process now used in liquid phase hydrogenation of esters. And even better results are obtained when the catalyst contains also oxides of one or more alkalies and/or alkaline earths, particularly barium, calcium or magnesium oxide. The yields are much greater and the time less than when other known catalysts or processes are employed. For example the nickel catalyst obtained by reducing nickel-chromium oxides catalyzed the hydrogenation of ethyl laurate to the extent of only 40% after seven hours at 250° C. A catalyst such as described by us catalyzed the hydrogenation of ethyl laurate to the extent of substantially 100% after 1.8 hours at 250° C.

The catalyst employed by us is not nearly so sensitive as nickel to sulfur- or halogen-containing impurities in the ester to be hydrogenated. Its less sensitivity toward deactivation probably accounts for the fact that it is much more active after it has begun to act than is nickel. No special apparatus such as a reduction furnace is needed in the preparation of the catalyst and it need not be freshly prepared before use. The catalyst ready for use does not change on standing in contact with air. In fact, it apparently need not be treated with any more care than would be accorded to such a reagent as sodium chloride. Less labor is involved in its preparation and smaller quantities may be used for reductions than is the case with the nickel catalyst. A sample of the catalyst may be used repeatedly, that is to say, it is not rapidly deactivated during use.

As mentioned above it is immaterial for the purpose of our invention how the catalyst is prepared. It may be prepared as described by Lazier in U. S. Patents 1,746,782 and 1,746,783. Suitable methods of preparation are described in co-pending application Serial No. 593,190 filed Feb. 15, 1932 a number of which we give here. All temperatures are centigrade.

*Mixture of copper, barium and chromium oxides*

3.5 g. of barium chromate and 17.9 g. of ammonium chromate were decomposed by heating in order to obtain barium and chromium oxides. The resulting mixture was then thoroughly ground with 10.2 g. of copper oxide (CuO). The resulting powder was suspended in 50 cc. of 10% acetic acid, filtered, washed with water and dried.

The mixture was then heated at 450° for 5 minutes.

4 g. of this catalyst brought about 85% reduction of 0.17 mole of the ethyl ester of B-phenyl propionic acid within 7.25 hrs. at 250° at 250 atmospheres pressure.

Mixture of copper and chromium oxides 8 g. of copper oxide and 7.6 g. of chromium oxide were ground together, and then heated for 5 minutes at 450°.

From copper-calcium-ammonium-chromates 300 cc. of a solution, containing 87 g. of hydrated copper nitrate and 6.6 g. of calcium nitrate was added to 240 cc. of a solution containing 50.4 g. of ammonium dichromate, and 50 cc. of 28% ammonium hydroxide. The precipitate was filtered with suction, dried at 75–80° for 12 hours and decomposed in three portions in a casserole over a free flame. The mixture was constantly stirred and the decomposition carried out at the lowest temperature at which it proceeded spontaneously. The product after cooling was leached for 30 minutes with 200 cc. of 10% acetic acid, filtered, washed with 200 cc. water in six portions and then pulverized. The weight of catalyst was 38 g.

2.5 g. of this catalyst brought about the hydrogenation of ethyl phenyl acetate in 3 hours at 250°, 250 atmospheres pressure giving a yield of 80% phenyl ethyl alcohol.

Precipitated carbonate catalyst 5.4 g. of barium nitrate $(Ba(NO_3)_2)$ was dissolved in 50 cc. of boiling water.

77.2 g. of chromium nitrate $(Cr_2(NO_3)_6 \cdot 15H_2O)$ was dissolved in 450 cc. of warm water.

100 g. of copper nitrate $(Cu(NO_3)_6 \cdot 3H_2O)$ was dissolved in 150 cc. of water.

94.4 g. of ammonium carbonate $$((NH_4)_2CO_3 \cdot H_2O)$$

was dissolved in 535 cc. of water.

The solutions of the three nitrates were mixed and the solution of the carbonate was added. There was a considerable amount of effervescence and a precipitate was formed. This was filtered, and dried at 110–120°. It was pulverized and then decomposed by heating to 150–250°. The residue was then suspended in 100 cc. of a 10% water solution of acetic acid, filtered, washed with water and dried. 57 g. of product was so obtained.

4 g. of this catalyst brought about the hydrogenation of 0.17 mols of the ethyl ester of β-phenyl propionic acid within 2 hours at 250° at 250 atmospheres pressure.

Decomposition of nitrates 2.7 g. of barium nitrate $(Ba(NO_3)_2)$, 25.0 g. copper nitrate $(Cu(NO_3)_2 \cdot 3H_2O)$ and 38.6 g. chromium nitrate $(Cr_2(NO_3)_6 \cdot 15H_2O)$ were mixed by grinding and then heated in a casserole. The solid melted, became viscous, as water was driven off, and then oxides of nitrogen were given off. The mixture was cooled, when oxides of nitrogen were no longer copiously evolved, and then pulverized. The powder was then heated until no more oxides of nitrogen were evolved. After cooling and further pulverizing the powder was suspended in a 10% solution of acetic acid, filtered, washed with water and dried. The yield was 23 g.

4 g. of this catalyst brought about the reduction of 0.17 mol. of the ethyl ester of β-phenyl propionic acid within 3.5 hrs. at 250° at 250 atmospheres pressure.

Following are listed as examples various groups of compounds hydrogenated according to our invention with the catalysts heretofore described, and a table which is more detailed as to the compound hydrogenated, temperature, yield, etc. In general the esters are subjected at 100° to 300° C. preferably at about 250° C. either alone or in a solvent to the action of hydrogen under pressures up to 500 atmospheres in the presence of catalysts containing oxides of copper with or without oxides of other hydrogenating metals, and oxides of one or more acid-forming metals, particularly oxides of copper and chromium, or catalysts containing in addition oxides of one or more alkali metals or alkaline earth metals, especially calcium, magnesium or barium oxide. Higher temperatures and greater pressures can be employed with good results but those above mentioned are preferred. It is to be understood that the temperatures, pressures, condition of operation etc. are in no way to be considered a limitation on the scope of our discovery, but the examples merely illustrate feasible embodiments of the invention as to the particular material specified.

The carbethoxy group of esters has been converted into a carbinol or alcohol group (esters of valeric, trimethyl acetic, caproic, caprylic, lauric, myristic, phenyl acetic, cinnamic, phenyl propionic, lactic, succinic, glutaric, sebacic, α-phenyl butyric, acetoacetic, β-hydroxy butyric, levulinic, α-α-diethyl β-hydroxy butyric, hexahydrobenzoic, stearic, palmitic (including spermacetic or cetyl palmitate)).

Lactones have been converted to glycols (valerolactone).

Acids have been hydrogenated to the corresponding alcohols without isolating the ester, i. e. by heating the acid with a suitable alcohol and then subjecting the mixture of ester, alcohol, acid and water to hydrogenation (stearic and caproic acids).

The esters derived from the alcohols of higher molecular weight are hydrogenated more rapidly and at lower temperatures than the esters derived from the lighter alcohols. In particular butyl and cyclohexyl esters are rapidly hydrogenated.

The data on the hydrogenation of several esters in the presence of a catalyst of the type containing oxides of copper with or without oxides of other hydrogenating metals and oxides of one or more acid-forming metals, especially oxides of copper and chromium or of copper, chromium and one of the group of barium, calcium, and magnesium are recorded in the table. The hydrogen pressure during the hydrogenations approximated 220 atmospheres and the temperature was 250°. The products from all the hydrogenations were subjected to fractional distillation through a Widmer column in order to separate the products. In the case of spermacetti and of ethyl valerate, ethyl phenyl acetate, and ethyl cinnamate there was 1 to 38% of unreduced ester in the respective reaction mixture after hydrogenation, but in no other case was there any residual ester. The hydrogen absorption, as measured in each case, was from 0.03 to 0.07 mol. of hydrogen above that required for the hydrogenation of the ester. This discrepancy was probably due to the diffusion of hydrogen through the walls of the bomb. The yields of alcohols given are those actually obtained, having the indicated boiling or melting point, except in the case of n-amyl alcohol, where two applications of catalysts were necessary and there was a mechanical loss. Allowance was made for the weight of product so lost in calculating the yield given in the table for this alcohol.

pared in a similar manner to that described above for the copper-chromium oxide catalyst and for the copper-chromium-barium oxide catalyst or in any other suitable manner. All

Table (Except where indicated otherwise the temperature was 250° C. and 175 to 250 atmospheres pressure.)

| Name and mols of ester | Catalyst (oxides) | Hours time | Name and yield of product |
|---|---|---|---|
| Ethyl valerate (0.27) | 5g. (Cu-Cr) | 13 | n-Amyl alcohol (94.1%). |
| Ethyl trimethyl acetate (0.23) | 5g. (Cu-Cr) | 1.5 | tert. Butyl carbinol (88.3%.) |
| Methyl caproate (0.20) | 5g. (Cu-Cr-Ba) | 2.3 | n-Hexyl alcohol (92.2%). |
| n-Butyl caproate (0.20) | 5g. (Cu-Cr-Ba) | 0.6 | n-Hexyl alcohol (95.5%). |
| Ethyl α-phenyl succinate (0.20) | 5g. (Cu-Cr-Ba) | 3.0 | 2-phenyl butanediol 1-4 (10%). |
| Ethyl caprylate (0.20) | 5g. (Cu-Cr-Ba) | 2.0 | n-Octyl alcohol (93.6%). |
| Ethyl laurate (0.13) | 3g. (Cu-Cr) | 1.8 | Lauryl alcohol (97.5%). |
| Ethyl laurate (0.13) | 3g. (Cu-Cr-Ba) | 1.0 | Lauryl alcohol (97%). |
| Ethyl myristate (0.15) | 5g. (Cu-Cr) | 2.0 | Myristyl alcohol (98.5%). |
| Ethyl phenyl acetate (0.28) | 2.5g. (Cu-Mg-Cr) | 1.8 | Phenyl ethyl alcohol (58%). |
| Ethyl phenyl acetate (0.25) | 6g. (Cu-Cr-Ba) | 1.5 | Phenyl ethyl alcohol (38%). |
| Ethyl phenyl acetate (0.28) | 2.5g. (Cu-Ca-Cr) | 0.4 | Phenyl ethyl alcohol (50%). |
| Ethyl cinnamate (0.21) | 3g. (Cu-Cr) | 9.0 | β-Phenyl propyl alcohol (83%). |
| Ethyl α-phenyl butyrate (0.25) | 6g. (Cu-Cr) | 0.6 | β-Phenyl butyl alcohol (78%). |
| Ethyl β-phenyl propionate (0.17) | 4g. (Cu-Cr-Ba) | 1.0 | β-Phenyl propyl alcohol (95%). |
| Ethyl hexahydrobenzoate (0.25) | 5g. (Cu-Cr-Ba) | 0.6 | Cyclohexyl carbinol (97.5%). |
| Ethyl lactate (0.26) | 5g. (Cu-Cr-Ba) | 3.5 | α-Propylene glycol (90%). |
| Diethyl ester of ethyl malonic acid (0.2) | 5g. (Cu-Cr-Ba) | 4.8 | sec. Amyl alcohol (77%). |
| Spermacetti (0.15) | 5g. (Cu-Cr-Ba) | 4.0 | Cetyl alcohol (96%). |
| Diethyl succinate (0.44) | 7g. (Cu-Cr) | 6.5 | Tetramethylene glycol (80.5%). |
| Di-n-butyl glutarate (0.20) | 7g. (Cu-Cr-Ba) | 1.8 | Pentamethylene glycol (92.2%). |
| Diethyl sebacate (0.12) | 5g. (Cu-Cr-Ba) | 1.7 | Decamethylene glycol (94%). |
| Ethyl β hydroxy butyrate (3.0) | 6g. (Cu-Cr-Ba) | 5.0 | Butyl alcohols (55%). |
| Ethyl 2-2 dimethyl 3-hydroxy butyrate (0.2). | 4g. (Cu-Cr) | 0.1 | Isobutyl alcohol (97%). |
| Valerolactone (0.3) | 5g. (Cu-Cr-Ba) | 0.1 | Pentanediol 1-4 (78%). |
| Lauryl caproate (0.12) | 2g. (Cu-Cr-Ba) | 8.6 (225°) | Hexyl alcohol (70%). |
| Stearic acid (0.20) and butanol (0.70) | 8g. (Cu-Cr-Ba) | 11.0 | Octadecanol-1 (77%). |
| Cyclohexyl caproate (0.12) | 2g. (Cu-Cr-Ba) | 3.0 (225°) | Hexyl alcohol (97%). |
| Ethyl caproate (0.12) | 2g. (Cu-Cr-Ba) | 7.5 (225°) | Hexyl alcohol (62%). |
| Butyl caproate (0.12) | 2g. (Cu-Cr-Ba) | 6.2 (225°) | Hexyl alcohol (85%). |

As illustrative of the action of the new type of catalysts in the form which includes oxides of other hydrogenating metals as well as oxides of copper the following examples are given:

A sample of ethyl phenyl acetate (0.25 mole) contained 36% residual ester after 9.5 hrs., 250° C., 250 atmospheres, with 6 g. of a copper-zinc-chromium oxide catalyst.

Ethyl laurate (0.13 mole) was hydrogenated to the extent of approximately 60% after 7.5 hours, 250° C., 250 atmospheres with 4 g. of a copper-iron oxide catalyst.

Ethyl hexahydrobenzoate (0.25 mole) was completely hydrogenated under these conditions in 5 hrs. with 5 g. of a copper, cadmium, chromium, barium, oxide catalyst. The same result was obtained in 1.5 hrs. with 5 g. of a copper, silver, chromium, barium oxide catalyst.

Instead of using a bomb in which to carry out the hydrogenation of esters a flow system can be used with excellent results, and, of course, is more desirable for commercial application of the process.

The rate of hydrogenation of esters as heretofore described is very much more rapid at higher pressures and very high pressures can be employed. Pressures in the range of 100 to 500 atmospheres are particularly advantageous for the hydrogenation of esters. The most effective pressure range runs from 200 to 350 atmospheres. Ethyl laurate hydrogenated seven times as fast at 200 atmospheres as at 100 atmospheres, and four times as fast at 300 as at 200 atmospheres.

Together with copper oxide in the above reactions oxides of any one of the group of elements comprising zinc, cadmium, manganese, silver and iron or mixtures can be present in the catalyst. In place of chromium oxide, one may use oxides of vanadium and molybdenum or mixtures. In place of oxides of barium, calcium or magnesium, oxides of other alkalies and alkaline earths or mixtures may be employed. Catalysts containing these oxides may be prepared in a similar manner to that described above for the copper-chromium oxide catalyst and for the copper-chromium-barium oxide catalyst or in any other suitable manner. All these materials fall within the scope of our invention and it is our purpose to cover them in the claims which follow.

What we claim is:

1. In the process of hydrogenating in the liquid phase at elevated temperature and pressure an ester of the group consisting of: ethyl valerate, ethyl trimethyl acetate, methyl caproate, n-butyl caproate, ethyl α-phenyl succinate, ethyl caprylate, ethyl laurate, ethyl myristate, ethyl phenyl acetate, ethyl cinnamate, ethyl α-phenyl butyrate, ethyl α-phenyl propionate, ethyl hexahydrobenzoate, ethyl lactate, diethyl ester of ethyl malonic acid, spermacetti, diethyl succinate, di-n-butyl glutarate, diethyl sebacate, ethyl β hydroxy butyrate, ethyl 2-2 dimethyl 3-hydroxy butyrate, valerolactone, lauryl caproate, butyl stearate, cyclohexyl caproate, ethyl caproate, the step of carrying out the process in the presence of a catalyst containing essentially oxides of copper, chromium, and of one of the group of barium, calcium, and magnesium.

2. In the process of hydrogenating in the liquid phase at elevated temperature and pressure an ester of the group consisting of: ethyl valerate, ethyl trimethyl acetate, methyl caproate, n-butyl caproate, ethyl α-phenyl succinate, ethyl caprylate, ethyl laurate, ethyl myristate, ethyl phenyl acetate, ethyl cinnamate, ethyl α phenyl butyrate, ethyl β-phenyl propionate, ethyl hexahydrobenzoate, ethyl lactate, diethyl ester of ethyl malonic acid, spermacetti, diethyl succinate, di-n-butyl glutarate, diethyl sebacate, ethyl β hydroxy butyrate, ethyl 2-2 dimethyl 3-hydroxy butyrate, valerolacetone, lauryl caproate, butyl stearate, cyclohexyl caproate, ethyl caproate, the step of carrying out the process in the presence of a catalyst containing essentially oxides of copper and chromium.

3. A process as described in claim 1 carried out at pressures range up to 500 atmospheres and temperatures up to 300° C.

4. A process as described in claim 2 carried out at pressures up to 500 atmospheres and temperatures up to 300° C.

5. In the process of hydrogenating in the liquid phase at elevated temperature and pressure one of the group of esters listed in claim 2, the step of carrying out the reaction in the presence of a catalyst comprising essentially copper oxide, an oxide of an acid-forming metal and an oxide of the group of alkali metals and alkaline earth metals.

6. In the process of hydrogenating in the liquid phase at elevated temperature and pressure a compound of the group of esters listed in claim 2, the step of carrying out the reaction in the presence of a catalyst containing essentially copper oxide and an oxide of an acid-forming metal.

7. In the process of hydrogenating an ester to the corresponding alcohol, the step of reacting the ester with hydrogen, at elevated temperature and pressure, in the presence of a catalyst comprising essentially copper oxide, an oxide of an acid forming metal, and an oxide of a metal of the group consisting of alkali and alkaline earth metals.

8. In the process of hydrogenating an ester to the corresponding alcohol, the step of reacting the ester with hydrogen, at elevated temperature and pressure, in the presence of a catalyst comprising essentially copper oxide, an oxide of an acid forming metal, and an oxide of a metal of the group consisting of barium, calcium and magnesium.

9. In the process of hydrogenating an ester to the corresponding alcohol, the step of reacting the ester with hydrogen, at elevated temperature and pressure, in the presence of a catalyst comprising essentially copper oxide, chromium oxide and an oxide of a metal of the group consisting of alkali and alkaline earth metals.

10. In the process of hydrogenating an ester to the corresponding alcohol, the step of reacting the ester with hydrogen, at elevated temperature and pressure, in the presence of a catalyst comprising essentially copper oxide, chromium oxide, and an oxide of a metal of the group consisting of barium, calcium and magnesium.

11. In the process of hydrogenating an ester to the corresponding alcohol, the step of reacting the ester with hydrogen, at elevated temperature and pressure, in the presence of a catalyst comprising essentially copper oxide, chromium oxide and barium oxide.

HOMER ADKINS.
KARL FOLKERS.
RALPH CONNOR.